United States Patent
Shirai et al.

(10) Patent No.: US 7,485,391 B2
(45) Date of Patent: Feb. 3, 2009

(54) PROTON CONDUCTOR, PROCESS FOR PRODUCING THE SAME, AND ELECTROCHEMICAL DEVICE

(75) Inventors: Katsuya Shirai, Kanagawa (JP); Toru Kihira, Kanagawa (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 10/466,644

(22) PCT Filed: Jan. 9, 2002

(86) PCT No.: PCT/JP02/00054

§ 371 (c)(1),
(2), (4) Date: Jul. 17, 2003

(87) PCT Pub. No.: WO02/058079

PCT Pub. Date: Jul. 25, 2002

(65) Prior Publication Data

US 2004/0048127 A1 Mar. 11, 2004

(30) Foreign Application Priority Data

Jan. 18, 2001 (JP) .............................. 2001-009723

(51) Int. Cl.
*H01M 8/08* (2006.01)
(52) U.S. Cl. ............................. 429/46; 429/12; 429/29; 429/188; 429/313
(58) Field of Classification Search .................. 429/29, 429/188, 46, 12, 313
See application file for complete search history.

(56) References Cited

U.S. PATENT DOCUMENTS

| | | | | |
|---|---|---|---|---|
| 4,277,546 A | * | 7/1981 | Barsukov et al. | ............... 429/59 |
| 5,294,732 A | * | 3/1994 | Chiang et al. | .................. 560/86 |
| 5,470,680 A | * | 11/1995 | Loutfy et al. | ............. 429/218.2 |
| 6,495,290 B1 | * | 12/2002 | Hinokuma et al. | ........ 429/231.8 |
| 6,572,997 B1 | * | 6/2003 | Iqbal et al. | ..................... 429/34 |

FOREIGN PATENT DOCUMENTS

| | | |
|---|---|---|
| JP | 3-167712 | 7/1991 |
| JP | 8-249923 | 9/1996 |
| JP | 10-69817 | 3/1998 |
| JP | 11-203936 | 7/1999 |
| JP | 2000-256007 | 9/2000 |
| WO | WO 01/06519 | 1/2001 |

OTHER PUBLICATIONS

H.W. Kroto et al., $C_{60}$: *Buckminsterfullerene*, Nov. 1985, Nature v. 318, pp. 162-163.
Long Y. Chiang et al., *Multi-hydroxy Additions onto $C_{60}$ Fullerene Molecules*, J. Chem. Soc., 1992 pp. 1791-1793.
Long Y. Chiang et al., *Efficient Synthesis of Polyhydroxylated Fullerene Derivatives via Hydrolysis of Polycyclosulfated Precursors*, American Chem. Society, 1994, pp. 3960-3969.

* cited by examiner

*Primary Examiner*—Jane Rhee
(74) *Attorney, Agent, or Firm*—Bell, Boyd & Lloyd LLP

(57) ABSTRACT

Proton conductors, electrochemical devices employing same and methods of manufacturing same are provided. The proton conductor includes silicon oxide, bronsted acid and a derivative of a carbonaceous material predominantly composed of carbon and proton ($H^+$) dissociating groups introduced to carbon atoms of the carbonaceous material. The proton conductor is produced by a step of forming a compound predominantly composed of silicon oxide and bronsted acid by a sol-gel method, and a step of mixing the compound with a derivative of a carbonaceous material obtained on introducing proton ($H^+$) dissociating groups to carbon atoms forming a carbonaceous material predominantly composed of carbon.

41 Claims, 8 Drawing Sheets

PROTON CONDUCTOR, PROCESS FOR PRODUCING THE SAME, AND ELECTROCHEMICAL DEVICE

CROSS REFERENCES TO RELATED APPLICATIONS

This patent application claims priority to Japanese Patent Document No. 2001-009723 filed on Jan. 18, 2001, the disclosure of which is herein incorporated by reference.

BACKGROUND OF THE INVENTION

This present invention relates to a proton conductor, its manufacturing method and an electro-chemical device.

A solid substance through the inside of which migrate ions is contemplated as a possible material associated with an electro-chemical device enumerated first of all by a cell. Currently, ionic conductors of a variety of conducting ion species, such as $Li^+$, $Ag^+$, $Cu^+$, $H^+$ or $F^-$, have been found. In particular, the ionic conductors, having protons ($H^+$) as conducting ion species, are expected to be used for a variety of electro-chemical devices, such as fuel cells or electrochromic display devices, as now explained.

For example, in the case of a fuel cell, having hydrogen as fuel, a reaction (1):

$$H_2 \rightarrow 2H^+ + 2e \quad (1)$$

occurs to yield protons, which protons migrate through an electrolyte so as to be consumed in an air electrode by a reaction (2):

$$1/2 O_2 + 2H^+ + 2e^- \rightarrow H_2O \quad (2)$$

so as to be turned into water and so as to generate an electro-chemical energy. In this regard, by employing the proton conductor as an electrolyte, it is possible to construct a fuel cell fueled by hydrogen.

A fuel cell, as an electro-chemical device, obtained by application of the proton conductor, is expected to be used as a power supply for generating relatively large current, such as for a standstill use or for an electrical car. To this end, it is necessary to construct the solid electrolyte layer of a larger area. It is noted that one of the merits of the electrochromic display device, as an electro-chemical device obtained on application of the proton conductor, is its wide field of view. Since the electrochromic display device does not use a polarization plate, in contradistinction from a liquid crystal display plate, recognition of an object may be made from a wide angle.

Among known types of the proton conductors, there are inorganic substances, such as, for example, uranyl phosphoric acid hydrates or molybdo phosphoric acid hydrates, and organic substances, such as, for example, polymer ion exchange membranes, composed of vinyl fluoride based polymer with side chains inclusive of perfluorosulfonic acid. The method for forming thin films of the inorganic substances may be enumerated by a vapor deposition method and a casting method. However, with the film deposition by the vapor deposition method, not only the production cost is high, but also difficulties are encountered in producing a thin film of a larger area. With the casting method, which is a method of casting a sol containing the proton conductor on a substrate and allowing to form a gel to produce a proton conductive thin film, a thin film obtained by this method includes fine pores formed on solvent evaporation. Thus, when the proton conductor is applied to a fuel cell, since the active material of the fuel cell is gases, namely hydrogen and oxygen, for example, these gases are transmitted through the pores of the proton conductor gel to lower the power generation efficiency.

In an inorganic proton conductor, since protons in the crystal water contribute to conduction, such crystal water tends to be desorbed at elevated temperatures to lower the protonic conductivity.

As a method for possibly overcoming the aforementioned problem to prepare an electrode layer of a larger area, it has been proposed to add a thermoplastic resin to powders of the solid electrolyte to produce a composite material. However, if the above-mentioned compound, in which proton conduction is produced by crystal water, is blended with the thermoplastic resin, hopping movement of protons between crystal water molecules is impeded by the thermoplastic resin, so that protonic conductivity tends to be lowered.

Although the ion exchange membrane is meritorious in that a membrane with a large area that may be processed readily, may be produced, such ion exchange membrane is costly at present and hence it has been desired to develop a proton conductor at lower cost. Moreover, since the ion exchanger resin exhibits high ionic conductivity only under a condition of high water content (tens of %), it suffers from a deficiency that, when the resin is dried, its protonic conductivity is lowered.

For overcoming the aforementioned problem inherent in the proton conductor, the proton conductors disclosed in Japanese Laying-Open Patent Publications H-8-249923, H-10-69817 and H11-203936 are constituted by a compound predominantly composed of silicon oxide and bronsted acid, an organic polymer having a thermoplastic elastomer or a sulfonic group as a side chain, or a mixture of sulfonides of block copolymers made up of a conjugated diene unit and an aromatic vinyl unit.

Although the proton conductor composed of a mixture of the compound composed substantially of silicon oxide and bronsted acid and a variety of polymers is improved to some extent with the technique disclosed in particular in Japanese Laying-Open Patent Publication H-10-69817. However, there still remains a problem that the proton conductor is inferior in molding or processing performance due to for example film hardening.

On the other hand, the protonic conductivity of the proton conductor composed of the aforementioned mixture is changed with the degree of sulfonation of the polymer making up the mixture. Since the sulfonation degree of the polymer is limited by the type of the monomers making up the polymer, the number of sulfonic groups of the polymer is not enough to form an optimum proton conductor layer in the boundary to the compound composed predominantly of silicon oxide and bronsted acid, thus raising difficulties in connection with achieving high protonic conductivity.

A need therefor exists to provide improved proton conductors, methods of manufacturing same and electrochemical devices that employ same.

SUMMARY OF THE INVENTION

In an embodiment, the present invention provides a proton conductor including silicon oxide, bronsted acid and a derivative of a carbonaceous material substantially composed of carbon and proton ($H^+$) dissociating groups introduced to carbon atoms of the carbonaceous material.

In am embodiment, the present invention provides a method for producing a proton conductor including a step of forming a compound predominantly composed of silicon oxide and bronsted acid by a sol-gel method, and a step of mixing this compound with a derivative of a carbonaceous material obtained on introducing proton ($H^+$) dissociating groups to carbon atoms forming a carbonaceous material predominantly composed of carbon.

In the present invention, the term "proton ($H^+$) dissociating groups" and/or other like terms means functional groups from which protons may be desorbed on electrical dissociation, and "proton desorption" and/or other like terms means separation of protons from the functional groups on electrical dissociation.

According to an embodiment of the present invention, a sufficient amount of proton dissociating groups as compared to that introduced to other carbonaceous materials having a polymer material as a skeleton can be introduced, so that an optimum proton conductor layer may be formed on an interface between silicon oxide, bronsted acid and the derivative of the carbonaceous material. Consequently, the proton conductor according to an embodiment of the present invention, employing silicon oxide and bronsted acid, has a high mobile ion concentration. In addition, the proton conductor according to an embodiment of the present invention, containing the derivative of the carbonaceous material, is able to realize high protonic conductivity.

Since the present invention employs a derivative of the carbonaceous material, composed substantially of carbon, as a constituent material of the proton conductor, the proton conductor according to an embodiment the present invention may operate in a low humidity atmosphere, such that its protonic conductivity is not lowered even in a dry atmosphere.

Since the derivative of the carbonaceous material is not a polymer, the proton conductor according to an embodiment of the present invention is subjected to mechanical interaction with the silicon oxide to a lesser extent than a proton conductor having the polymer as a skeleton. The proton conductor of the present invention therefore remains flexible while it retains high ionic conductivity so that it is superior in film-forming properties and in workability.

The electro-chemical device in an embodiment includes a first electrode, a second electrode and an electrolyte electrically contacted with the first and second electrodes, wherein the electrolyte is composed of silicon oxide, bronsted acid and a derivative of a carbonaceous material including proton ($H^+$) dissociating groups introduced to carbon atoms of the carbonaceous material substantially composed of carbon.

The electro-chemical device according to an embodiment of the present invention, in which the electrolyte electrically contacted with the first and second poles is composed of silicon oxide, bronsted acid and a derivative of the carbonaceous material, achieves favorable effects similar to those proper to the proton conductor of the present invention, and hence is superior in current density and output characteristics.

Additional features and advantages of the present invention are described in, and will be apparent from, the following Detailed Description of the Invention and the figures.

DETAILED DESCRIPTION OF THE INVENTION

Figure 1B:
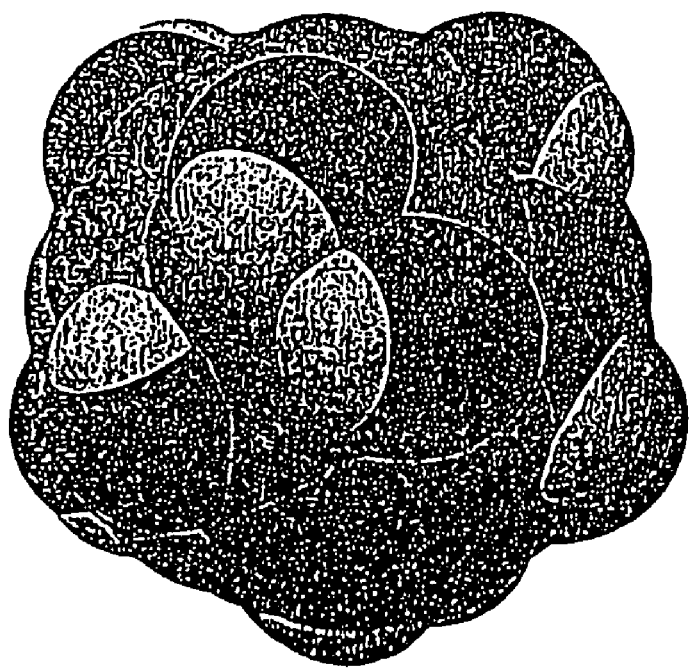
FIGS. 1A and 1B illustrate the structures of fullerene polyhydroxide as a derivative of a carbonaceous material according to an embodiment of the present invention.

The present invention generally relates to proton conductors, electrochemical devices employing same, and methods of manufacturing same. The present invention is described below in greater detail with reference to certain preferred embodiments thereof.

As bronsted acid, used in the present invention, phosphoric acid ($H_3PO_4$) or its derivatives, perchloric acid ($HClO_4$) or its derivatives, are preferably employed according to an embodiment. It should be appreciated that other suitable bronsted acids and mixture thereof can be employed.

Silicon oxide may be represented by the following general formula:

$$SiO_x (1 \leq x \leq 2) \tag{1}$$

Silicon oxide contain —OH groups as surface terminal groups. It is protons of these —OH groups that contribute to ionic conduction. By further adding bronsted acid to the silicon oxide, this type of acid operates as proton donors to silicon oxide to raise the concentration of mobile ions, so that the proton conductor of the present invention exhibits high protonic conductivity.

If a derivative of a carbonaceous material, obtained on introducing proton dissociating groups into a carbonaceous material, composed substantially of carbon, is interposed in silicon oxide and bronsted acid, protons desorbed on electrical dissociation from the —OH groups of the silicon oxide are able to migrate via the proton dissociating groups of the derivative of the carbonaceous material, such that the derivative of the carbonaceous material contributes to protonic conduction. Thus, with the proton conductor of the present invention, a proton conductor layer is formed on an interface between the silicon oxide, bronsted acid and the carbonaceous material that can exhibit a superior proton conduction performance.

Since the derivative of the carbonaceous material is not a polymer, the proton conductor according to an embodiment of the present invention is subjected to mechanical interaction with silicon oxide to a lesser extent than a proton conductor having the polymer as a skeleton, and remains flexible as it retains high ionic conductivity. On the other hand, the proton conductor of the present invention can be molded without employing a solvent and is superior in workability.

The proton conductor, employing silicon oxide, known in the art, may be enumerated by silica gel carrying sulfuric acid on its surface. On the other hand, the proton conductor according to an embodiment of the present invention is not simply carrying an acid on its surface, but is a compound of a silicon oxide and bronsted acid because the position of the IR absorption spectrum associated with to the —OH group is changed depending on the concentration of the bronsted acid.

If a substance which produces protonic conduction by crystal water is used, protonic conductivity is lowered in a dry atmosphere by loss of crystal water in known proton conductor material, as discussed above. Conversely, with the proton conductor according to an embodiment of the present invention, protonic conduction occurs about the —OH group, bonded to the surface of the silicon oxide, as the center. The —OH group, thus chemically combined, is not likely to be desorbed even in a dry atmosphere, so that it is possible to prevent the protonic conductivity from being lowered subject to such conditions. Moreover, the proton conductor of the present invention, containing the aforementioned derivative of the carbonaceous material, is able to operate optimally in a dry atmosphere, to prohibit the protonic conductivity from being lowered.

It is noted that phosphoric acid ($H_3PO_4$) as bronsted acid is a trivalent bronsted acid and, if the proton conductor according to an embodiment of the present invention is synthesized using this acid, the proton concentration is high, such that a proton conductor having higher ionic conductivity may be obtained. For this reason, phosphoric acid or its derivative is preferably employed. On the other hand, the perchloric acid ($HClO_4$), as bronsted acid, has a strong action as a proton donor, so that, if this bronsted acid is used as the dopant for silicon oxide, the proton conductor synthesized according to the present invention has a higher protonic conductivity. For this reason, perchloric acid is used most preferably as bronsted acid, in addition to phosphoric acid.

The compound substantially composed of silicon oxide and bronsted acid, as synthesized by the sol-gel method, has a large surface area. Moreover, since the majority of —OH groups, bonded to silicon oxide may be present on the surface of silicon oxide, the density of —OH groups may be higher, as a result of which the proton conductor according to the present invention may be superior in protonic conductivity. On the other hand, the proton conductor of the present invention, obtained by the manufacturing method of the present invention may be formed rather easily into a thin film of a larger area, and hence may be preferably used as an electrolyte for an electro-chemical device.

It is desirable that a compound substantially composed of silicon oxide and bronsted acid is formed and that the ratio of this compound to the derivative of the carbonaceous material by weight is (1:1) to (100:1). If the amount of the derivative of the carbonaceous material is too small, the protonic conductivity may effectively not be improved. If conversely the amount of the derivative of the carbonaceous material is too large, the proton supply source may effectively be decreased.

In the carbonaceous material, as the matrix, used in the proton conductor according to an embodiment of the present invention, any suitable material may be used, provided that the material used is predominantly composed of carbon. It is however preferred that, after the proton dissociating groups have been introduced, the ionic conductivity is desirably higher than electronic conductivity.

As the carbonaceous material, as the matrix, carbon clusters, as flocculated carbon atoms, or a carbonaceous material, containing tube-like carbonaceous material, may specifically be used. It is however preferred that the carbonaceous material is composed predominantly of for example carbon clusters. The carbonaceous material may also be composed of carbon clusters.

The cluster is an aggregate of several to hundreds of atoms bonded or flocculated together. By this aggregation or flocculation, protonic conductivity may be improved, while chemical properties may be maintained in stability. The "cluster composed predominantly of carbon" and/or other like terms including "cluster composed substantially of carbon" means an aggregate formed by several to hundreds of carbon atoms, regardless of the type of carbon-carbon bonds. It should be noted that the cluster need not be composed only of carbon atoms, but other atoms may also be present together. The aggregate in which carbon atoms account for the major portion is termed a carbon cluster.

Since the proton conductor according to an embodiment of the present invention is composed of a carbonaceous derivative, made up of a carbon cluster as a carbonaceous material, and proton dissociating groups, introduced thereto, protons tend to be electrically dissociated even in a dry state. So, the proton conductor according to an embodiment of the present invention is superior in protonic conductivity and is not lowered in protonic conductivity even in a dry atmosphere but maintains its high conductivity such that it remains to be superior in film-forming properties and in workability. Moreover, since a variety and number of types of carbonaceous materials are composed in the carbon cluster, there is a wide latitude of selection of the carbonaceous material.

The reason why the carbon cluster is used in this case as the matrix is that, for achieving optimum protonic conductivity, a large quantity of proton dissociating groups need to be introduced, which is rendered possible by the carbon cluster. Although this appreciably increases the acidity of the solid proton conductor, the carbon cluster is not susceptible to oxidative deterioration, in distinction from other carbonaceous materials, and is superior in durability, while constituent atoms are bonded tightly to one another, so that, if acidity is that high, there is no risk of interatomic bondage being collapsed, that is chemical change is not likely to be produced, and hence the film structure is maintained.

There are a variety of types of carbon clusters, as shown in FIGS. 1 to 6, such that there is a wide latitude of selection for the starting materials for the derivatives of the carbonaceous material constituting the proton conductor according to an embodiment of the present invention. The carbon cluster preferably includes fullerene molecules, a fullerene structure at least a portion of which has open ends, and a diamond structure and combinations thereof.

Although there is no limitation to the fullerene molecules as a carbon cluster, provided that they are spherical cluster molecules. In an embodiment, fullerene molecules that include $C_{36}$, $C_{60}$ (see FIG. 2), $C_{70}$ (see FIG. 2), $C_{76}$, $C_{78}$, $C_{80}$, $C_{82}$ and $C_{84}$, may desirably be used either singly or as a mixture.

These fullerene molecules were found in 1985 in the mass analysis spectrum of a cluster beam by laser ablation of carbon (Kroto, H. W.; Heath, J. R.; O'Brien, S. C.; Curl, R. F.; Smalley, R. E. nature 1985.318, 162). It is five years later that the manufacturing method was actually established. That is, the manufacturing method by arc discharge of a carbon electrode was found out in 1990 and, since that time, fullerene attracted attention as a carbonaceous semiconductor material.

The present inventors conducted research into protonic conductivity of derivatives of the fullerene molecules, and found that fullerene polyhydroxide, obtained on introducing hydroxy groups to the constituent carbon atoms of fullerene exhibit high protonic conductivity for a wide temperature range centered about the ambient temperature range, that is a temperature range encompassing the freezing temperature and the boiling temperature of water (at least from 160° C. to −40° C.), even in a dry condition. The present inventors have also found that, if hydrogen sulfate groups (ester) are introduced, in place of hydroxy groups, to the constituent carbon atoms of fullerene, it is possible to realize more pronounced protonic conductivity.

Figure 1A:
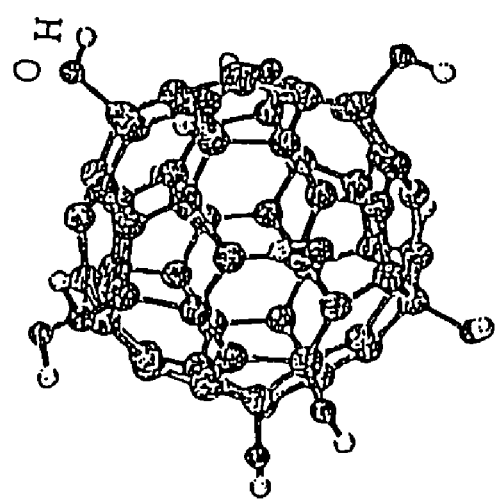

More specifically, fullerene polyhydroxide includes a compound composed of fullerene, to which a number of hydroxy groups are attached as shown in FIGS. 1A and 1B, and is routinely termed fullerenol. Synthesis examples for fullerenol were first reported by Chiang et al in 1992 (Chiang, L. Y.; Swirczewski, J. W.; HSU, C. S.; Chowdhury, S. K.; Cameron, S; Creegan, K. J. Chem, Soc, Chem. Commun. 1992, 1791). Since that time, fullerenol into which an amount in excess of a preset amount of hydroxy groups have been introduced has attracted attention in particular as to its being water-soluble, and has been investigated predominantly in the bio-related technical field.

Figure 2:
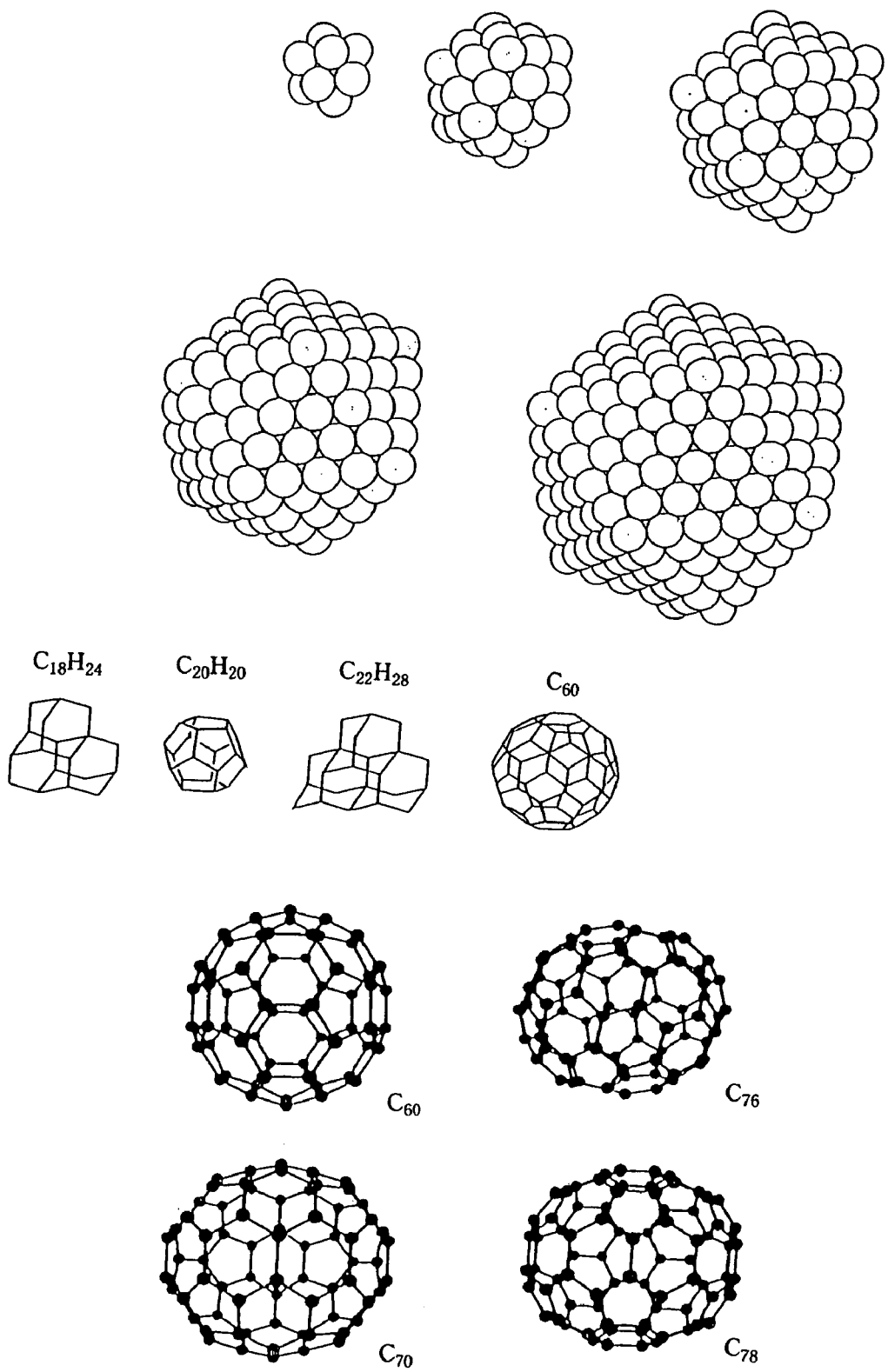
FIG. 2 shows various carbon clusters as a matrix in the proton conductor according to an embodiment of the present invention.

FIG. 2 shows a variety of carbon clusters, made up of a large number of carbon atoms, and which are provided with a closed surface structure of a spherical, spheroidal or similar structure. It is noted that molecular fullerene is also shown.

Figure 3:
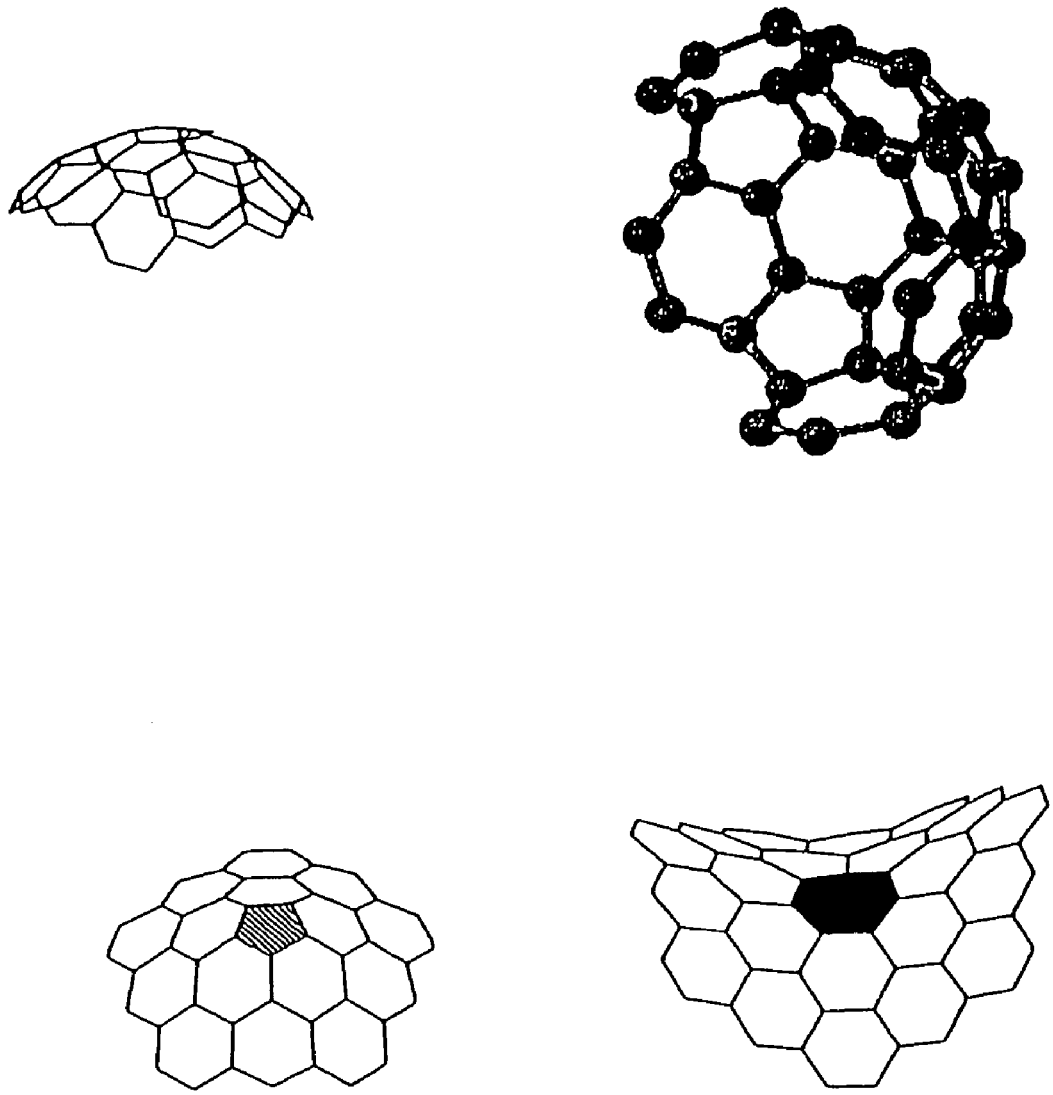
FIG. 3 shows carbon clusters (partial fullerene structure) as a matrix in the proton conductor according to an embodiment of the present invention.

FIG. 3 shows a variety of carbon clusters having partially defective spherical structures. In these cases, characteristic open ends are present in the structure. Such structures are often observed as by-products in the fullerene manufacturing process employing arc discharge, and exhibit reactivity proper to fullerene, while also exhibiting still higher reactivity in the defective portions, that is in the open portions. The result is that, by e.g., acid processing, introduction of the acid dissociating substituents (proton dissociating substituents) is accelerated to achieve a higher rate of substituent introduction and a higher protonic conductivity. Moreover, the carbon cluster can be synthesized in larger quantities at exceedingly low cost.

Figure 4:
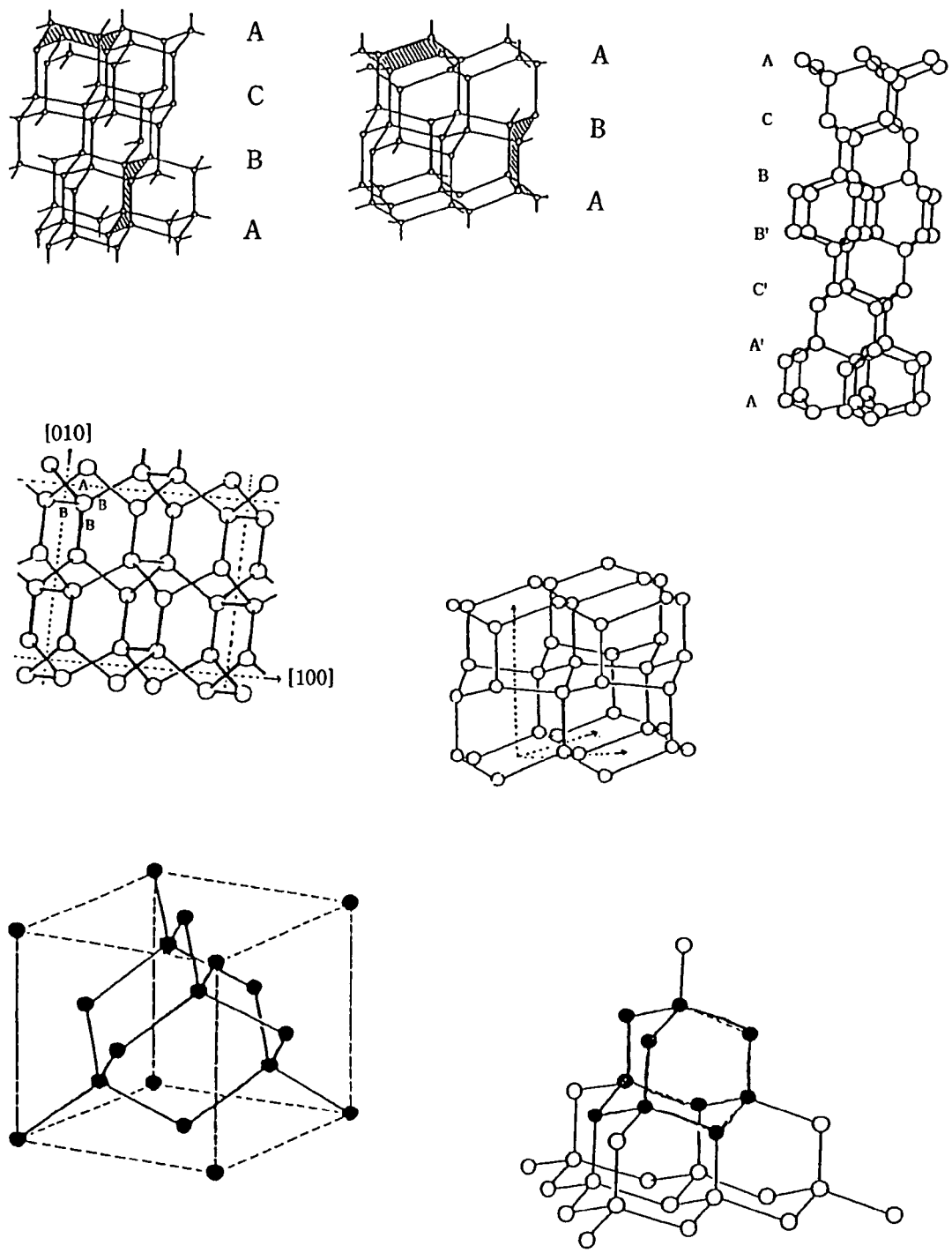
FIG. 4 shows carbon clusters (diamond structure) as a matrix in the proton conductor according to an embodiment of the present invention.

On the other hand, if the majority of carbon clusters are SP3-bonded, various types of clusters of a diamond structure, such as shown in FIG. 4, can be obtained.

The aforementioned carbon cluster, the major portions of carbon atoms of which are SP2 bonded, has a graphitic planar structure, or has the structure of all or part of fullerene or nanotubes. Of these, the carbon cluster having a graphitic structure in many cases exhibits electronic conductivity in the cluster. So, this carbon cluster is not desirable as a carbonaceous material constituting the proton conductor of the present invention.

Conversely, the SP2 bond of fullerene or nanotube contains SP3 bond in its portion and hence does not exhibit electronic conductivity, in many cases, so that it may be preferentially used as the aforementioned carbonaceous material constituting the proton conductor according to an embodiment of the present invention.

Figure 5:
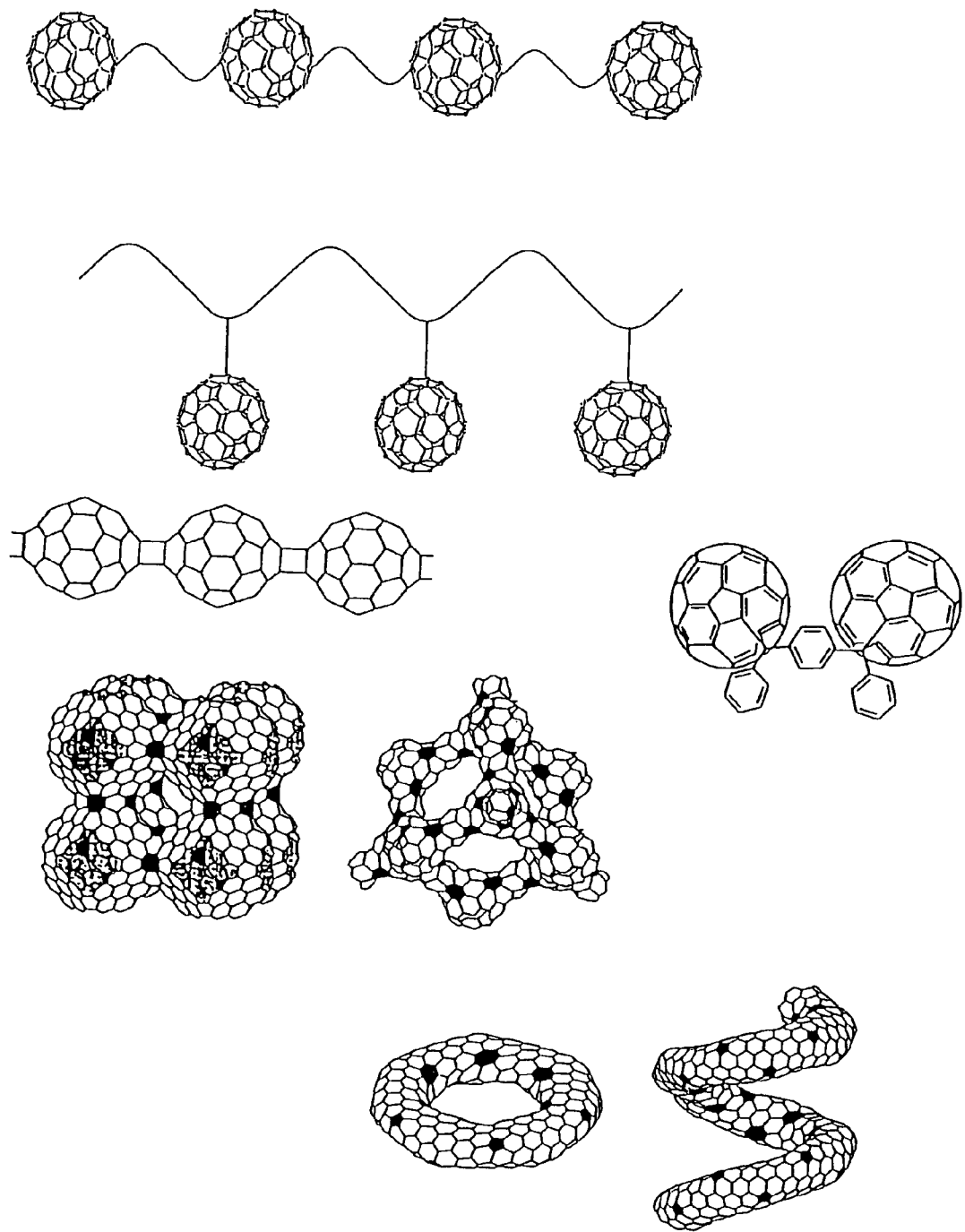
FIG. 5 shows carbon clusters (clusters linked together) as a matrix in the proton conductor according to an embodiment of the present invention.

FIG. 5 shows structures of various cluster-to-cluster bonds. These structures may similarly be used according to an embodiment of the present invention.

As the carbonaceous material, tubular carbonaceous materials may also be used. The tubular carbonaceous materials may be classified into so-called carbon nanotubes (CNT) with a diameter equal to approximately several nanometers (nm) or less, typically 1 to 2 nm, and carbon nanofibers (CNF) with a diameter not less than several nm, and occasionally reaching 1 μm in case of a large-sized structure. In particular, there are two known types of CNT, namely a single-walled carbon nanotube (SWCNT) composed of a single walled tube, and a multiwall carbon nanotube (MWCNT), in which two or more layers are overlapped concentrically.

These are of course merely illustrative such that any suitable structure may be used according to an embodiment of the present invention provided that the above requirement that ionic conductivity becomes higher than the electronic conductivity following introduction of the proton dissociating groups, is satisfied.

According to an embodiment of the present invention, it is necessary that the above-mentioned proton dissociating groups be introduced to the carbon atoms making up the carbon cluster. As for means for introducing the proton dissociating groups, the following manufacturing method is desirable.

That is, a carbon cluster composed of carbon powders is first prepared by arc discharge of a carbonaceous electrode and processed with an acid, such as with a sulfuric acid. The resulting product may further be hydrolyzed or sulfonated or formed into phosphoric acid ester to produce the derivative of the carbonaceous material as a target product.

The proton dissociating groups is represented by the formula —XH, where X is any optional bivalent atom or atom group, or by the formula —OH or —YOH, where Y is any optional bivalent atom or atom group.

For example, the groups that are able to dissociate protons can —COOH, —SO$_3$H or —OPO(OH)$_2$, in addition to —OH or —OSO$_3$H and suitable combinations thereof.

Figure 6A:
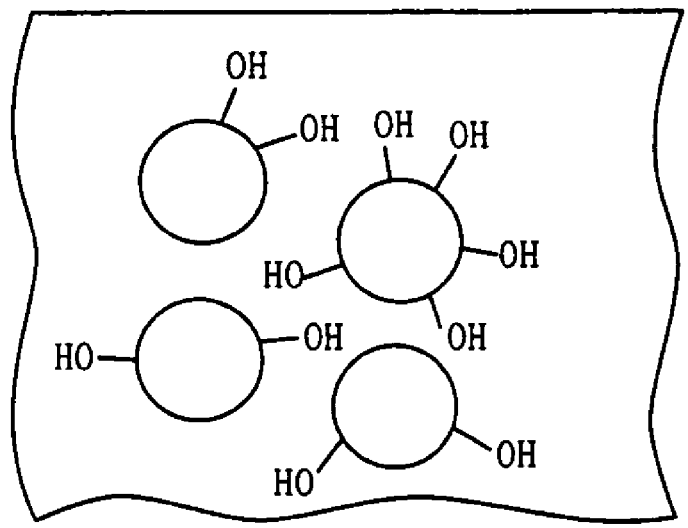
FIGS. 6A and 6B show fullerene derivatives as a matrix in the proton conductor according to an embodiment of the present invention.
Figure 6B:
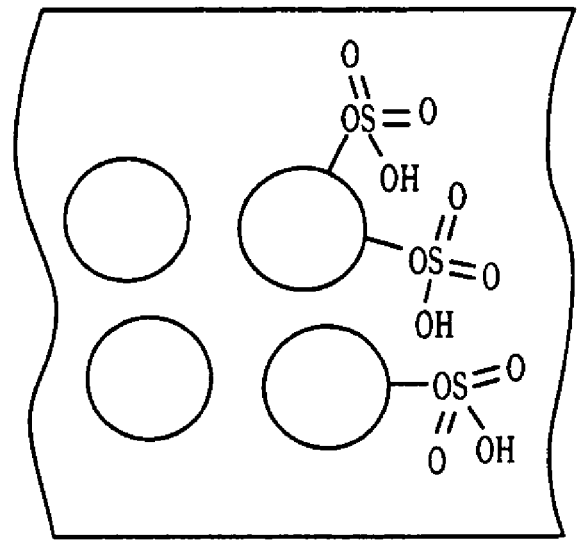

The present inventors first found out that, if for example fullerenol as a derivative of a carbonaceous material and silicon oxide are bonded together, along with bronsted acid, as shown schematically in FIG. 6A, and the resulting product is pressured to form a film increased in fullerenol density, so that interaction will be produced between hydroxy groups of neighboring fullerenol molecules, indicated by o in the drawing, the resulting flocculated product exhibits high protonic conductivity as a macroscopic aggregate, in other words, high H$^+$ dissociation characteristics from the phenolic hydroxy groups of the fullerenol molecules, at the same time as its permeation prohibiting performance for gases, such as hydrogen gas, is improved. In FIGS. 6A and 6B, the white portions indicate silicon oxide or bronsted acid forming the proton conductor according to an embodiment of the present invention, hereinafter the same.

More specifically, such a film is preferentially used which is obtained on bonding fullerene having a number of —OSO$_3$H groups, in addition to fullerenol, with silicon oxide and bronsted acid. Fullerene polyhydroxide, shown in FIG. 6B, in which the OSO$_3$H group is substituted for the OH group, as shown in FIG. 6B, that is fullerenol in the form of hydrogen sulfate (ester), was equally reported by Chiang et al., in 1994 (Chiang, L. Y.; Wang, L. Y.; Swirczewski, J. W.; Soled, S.; Cameron, S., J. org. Chem. 1994, 59, 3936). It is possible for fullerene in the form of hydrogen sulfate (ester) to contain only one OSO$_3$H group in one molecule, or to contain a plural number each of the latter groups and hydroxy groups.

As for the protonic conductivity exhibited by flocculation of a certain quantity each of silicon oxide, bronsted acid and the derivative of the carbonaceous material, as a bulk material, those protons derived from a large quantity of hydroxy groups or OSO$_3$H groups inherently contained in a molecule, are directly involved in migration, so that there is no necessity of taking hydrogen or protons derived from steam molecules from the atmosphere, nor of absorbing the moisture from outside, in particular from outside air, such that there is imposed no constraint on the atmosphere. Moreover, it may be contemplated that the aforementioned carbonaceous material in particular exhibits electrophilic properties, this appreciably contributing to promotion of electrical dissociation of hydrogen ions not only from the OSO$_3$H groups of high acidity but also from hydroxy groups. This is believed to contribute to the enhanced protonic conductivity of the proton conductor according to an embodiment of the present invention.

Moreover, since rather large quantities of hydroxy groups or $OSO_3H$ groups can be introduced to for example one fullerene molecule as the derivative of the carbonaceous material, the number density per unit weight of the conductor of protons taking part in the conduction is significantly increased. This isalso believed to contribute to enhanced proton conductivity of the proton conductor according to an embodiment of the present invention.

Since the major portions of the derivative of the carbonaceous material are constituted by carbon atoms, it is lightweight and is hardly susceptible to transmutation. Moreover, it is rather clean and is free of pollutants that may effect protonic conductivity.

In addition, in the aforementioned derivative of the carbonaceous material, the number of carbon atoms exposed to the front side is larger than that of the bulk carbonaceous material, so that the number of sites to which can be introduced the aforementioned proton dissociating groups is increased, as a result of which the derivative of the carbonaceous material may have numerous proton dissociating groups on its surface.

Any of the aforementioned derivatives of the carbonaceous material exhibits high protonic conductivity in a dry state to contribute to increasing the proton conduction performance of the proton conductor of the present invention.

The proton conductor in an embodiment of the present invention can directly be pressure-molded to a film or a pellet without using a binder. Alternatively, a binder may be used, in which case the proton conductor according to an embodiment of the present invention, having a sufficient strength, may be formed.

The polymer material usable as the binder may be one or more of known polymers exhibiting film-forming properties. The amount of mixing of the binder in the proton conductor of the present invention is usually not higher than 20 wt %, because the content in excess of 20 wt % tends to lower the conductivity of hydrogen ions.

The use of the binder affords film-forming properties, ascribable to the polymer material, to the proton conductor, such that the proton conductor may be used as a pliable ion conducting thin film, with a thickness usually not larger than 30 μm, higher in strength than a product molded by powder compaction of the silicon oxide, bronsted acid and the derivative of the carbonaceous material, and having the performance of prohibiting gas transmission.

It should be appreciated that, there is no limitation to the polymer material provided that the polymer material used impedes conductivity of hydrogen ions (such as by reaction with the fullerene derivative) to the least extent possible, and exhibits film forming properties. Usually, such a polymer material is used which does not exhibit electronic conductivity and which exhibits high stability. Specified examples of the high molecular material include polyfluoroethylene, polyvinylidene fluoride and polyvinyl alcohol the like and suitable combinations thereof. These are desirable polymer materials as described below.

First, polytetrafluoroethylene is desirable because a thin film of higher strength can be formed more easily with this polymer material than with any other polymer material. A small mixing amount of 3 wt % or less and preferably 0.5 to 1.5 wt % suffices, while the thickness of the thin film can be made as thin as 200 μm to 1 μm.

On the other hand, polyvinylidene fluoride or polyvinyl alcohol is preferred because it gives an ion conductive thin film exhibiting a higher gas transmission prohibiting performance. The mixing amount in this case is desirably 5 to 15 wt %.

The mixing amount of polyfluoroethylene, polyvinylidene fluoride or polyvinyl alcohol lower than the limit value of the above ranges may affect film forming.

For obtaining a thin film in which the proton conductor according to an embodiment of the present invention is bonded by the binder, any known film forming methods, including pressure molding and extrusion molding in the first place, may be used.

The carbon cluster, as a carbonaceous material in the proton conductor according to an embodiment of the present invention, is lightweight and insusceptible to transmutation, while being free from pollutants. Moreover, production cost of fullerene is also being lowered precipitously. Regarding resources, environment and economical advantages, carbon clusters as the carbonaceous material may be thought of as being a near-ideal carbonaceous material as compared to any other materials.

Figure 7:
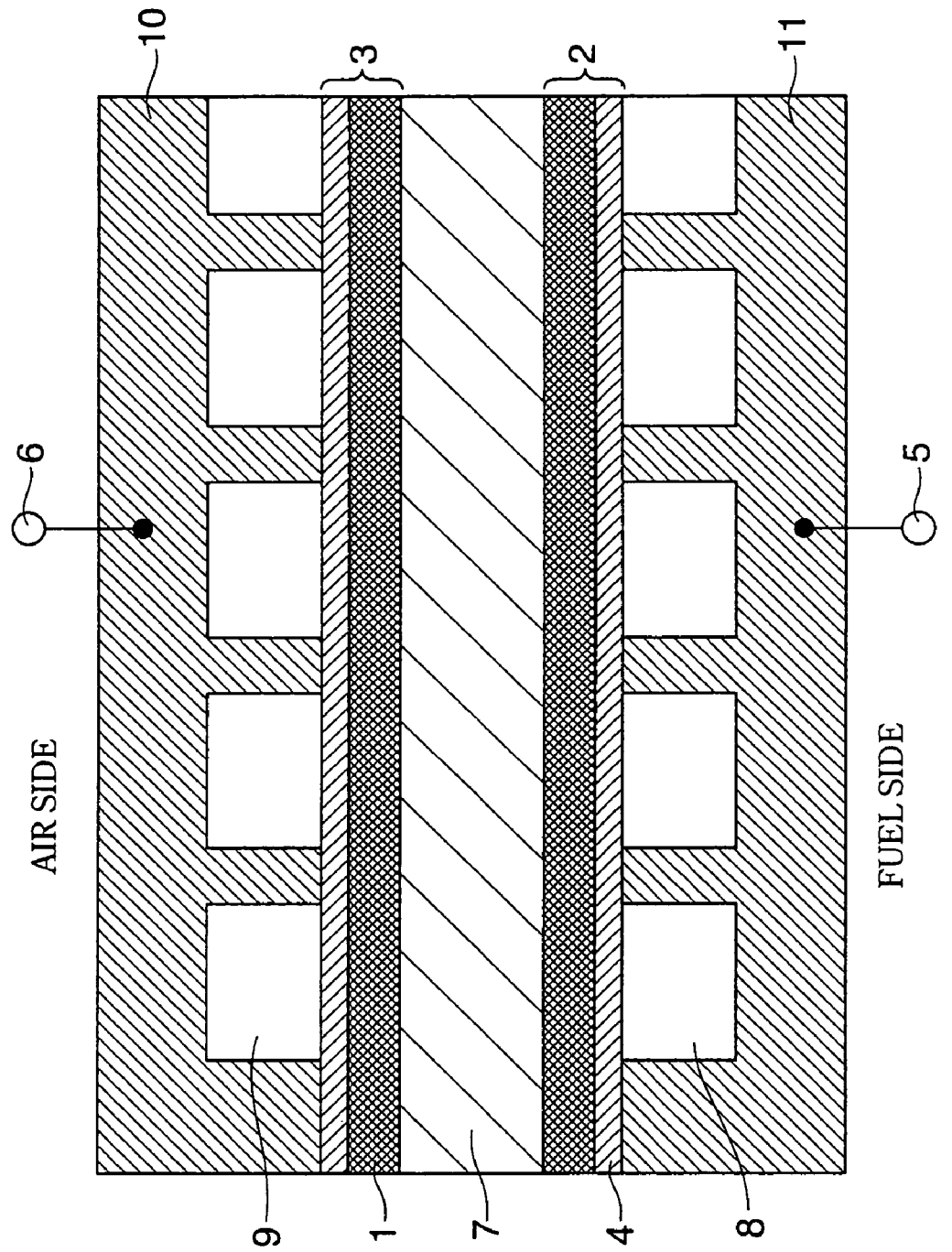
FIG. 7 is a schematic view showing the structure of a fuel cell according to an embodiment of the present invention.

FIG. 7 shows a fuel cell of an example employing a proton conductor of the present invention according to an embodiment. It is noted that a catalyst layer 1 of FIG. 7 is a layer of a mixture of carbon powders carrying platinum as catalyst, e.g., fluorine based water-repellent resin and a pore-forming agent ($CaCO_3$). The anode 2, as the first pole, and the cathode 3, as the second pole, are porous gas-diffusing electrodes, each made up of the catalyst layer 1 and, for example, a carbon sheet as a porous gas-transmitting aggregate 4. Between the anode 2 and the cathode 3 is sandwiched the proton conductor according to the present invention.

This fuel cell includes an anode 2 (fuel pole or hydrogen pole) and a cathode (oxygen pole) 3, facing each other and fitted with terminals 5 and 6, respectively. An ion conduction unit 7 composed of a proton conductor of the present invention is sandwiched between these two poles. In use, hydrogen is passed through an $H_2$ channel 8. As the fuel ($H_2$) is passed through the channel 8, hydrogen ions are generated, with which the fuel migrates towards the cathode 3 to react with oxygen (air) passing through an $O_2$ channel 9, whereby the desired electromotive force is taken out.

Meanwhile, the $H_2$ channel 8 and the $O_2$ channel 9 are constructed in separators 10, 11 formed of channel-shaped graphite.

This fuel cell has, as its electrolyte, a proton conductor, which is made up by silicon oxide, bronsted acid and a derivative of the carbonaceous material, in accordance with the teaching of the present invention. By employing silicon oxide and bronsted acid, the concentration of mobile ions is higher and, by further employing the derivative of the carbonaceous material, a higher protonic conductivity can be achieved.

Since the derivative of the carbonaceous material, composed predominantly of carbon, is used as a constituent material for the proton conductor, the proton conductor also operates in a low humidity atmosphere, so that protonic conductivity is not lowered even in a dry atmosphere.

The derivative of the carbonaceous material is not a polymer material, so that mechanical interaction thereof with silicon oxide is less than in case the derivative of the carbonaceous material includes the polymer as the skeleton. The proton conductor of the present invention therefore remains flexible while it retains high ionic conductivity so that it is superior in film-forming properties and in workability.

Since hydrogen ions are desorbed in the anode 2 and, as hydrogen ions are desorbed in the ion conduction unit 7, the hydrogen ions supplied from the anode 2 migrate towards the cathode 3, hydrogen ion conductivity is characteristically high, with the result that the system can be simplified in structure and lightweight, while it is possible to improve such functions as current density of output characteristics further.

In place of the ion conduction unit 7, which is composed only of the film-shaped proton conductor, according to an embodiment of the present invention, obtained on pressure molding silicon oxide, bronsted acid and the derivative of the carbonaceous material, and which is sandwiched between the first and second poles, a proton conductor bonded by a binder according to the present invention may also be used as the ion conduction unit 7. In such case, the ion conduction unit 7 bonded by the binder and hence having a sufficient strength may be formed.

The present invention is hereinafter explained more specifically without limitations based on Examples of the present invention according to an embodiment.

EXAMPLE 1

In the present Example 1, a proton conductor is fabricated using silica gel doped with phosphoric acid, as a compound composed predominantly of silicon oxide and bronsted acid, and also using a fullerene derivative, obtained on introducing hydroxy groups into fullerene (routinely termed fullerenol) as the derivative of the carbonaceous material comprised of a carbonaceous material composed predominantly of carbon into which have been introduced proton dissociating groups.

The silica gel, doped with phosphoric acid, was synthesized by the following method. As a starting material for synthesizing silica gel, tetraethoxysilane (TEOS) diluted in ethanol was used. The TEOS/ethanol mixing molar ratio was set to 1:4. To this solution were added pure water, in an amount by a molar ratio of 8 with respect to TEOS, a 3.6 wt % aqueous solution of hydrochloric acid which will give an amount of HCl in a molar ratio of 0.01 with respect to TEOS and tetraethyl ammonium tetrafluoroborate in an amount by a molar ratio of 0.01 with respect to TEOS, and the resulting mass was stirred for five minutes. A 85 wt % aqueous solution of phosphoric acid then was added in an amount which resulted in TEOS:$H_3PO_4$ []equaling 1:0.5 and the resulting mass was stirred for three hours in a hermetically sealed vessel. The resulting mixture was then allowed to stand for five hours for gelation and dried at 60° C. for two hours under a reduced pressure, to yield silica gel doped with phosphoric acid. The silica gel doped with phosphoric acid obtained as described above was then pulverized and stirred in NMP (1-methyl-2-pyrrolidone) in which for example ($C_{60}(OH)_{12}$) was dispersed. The weight ratio of the silica gel to fullerenol was set to 20:1. Finally, NMP was vaporized off under agitation to produce the proton conductor according to the present invention.

The ionic conductivity of the proton conductor, obtained as described above, was measured by the following method. 200 mg of the proton conductor, obtained by the above method, were pressure-molded to a disc-shaped pellet, 10 mm in diameter, and a gold foil was pressure bonded to both surfaces of the pellet to form electrodes for measuring the electrical conductivity. Using an electro-chemical cell, prepared as described above, the electrical conductivity of the proton conductor was measured at room temperature. As a result, the ionic conductivity indicated a value of $2.0 \times 10^{-3}$ S/cm. This proton conductor was stored for ten days in a desiccator charged with diphosphorus pentoxide as a drier and measurement was made of electrical conductivity thereof. It was found that conductivity was scarcely lowered. According to an embodiment of the present invention, as described above, it was found that such proton conductor can be obtained exhibiting high ionic conductivity which is effectively not lowered even in a dry atmosphere. The film is extremely pliable such that no problem was raised in molding the film to a desired shape.

Comparative Example

A film was formed in the same way as in Example 1, using a proton conductor to which sulfonated polyisopropylene was mixed in place of fullerenol. Although the value of the order of $10^{-3}$ to $10^{-4}$ S/cm could be obtained in measurement, the film was rather hard such that it was extremely difficult to mold the film to a desired shape.

EXAMPLE 2

In the present Example, a proton conductor was synthesized in the similar manner as in Example 1, except employing perchloric acid in place of phosphoric acid as the bronsted acid. In the same way as in Example 1, TEOS diluted with ethanol was added to with pure water, hydrochloric acid and perchloric acid in this order. At this time, the amounts of TEOS, ethanol, pure water and hydrochloric acid were to set to a molar ratio of 1:8:4:0.05. To this solution was added such an amount of perchloric acid which is equal 20 wt % based on the weight of silica gel, doped with perchloric acid, which may be estimated to be produced. The resulting solution was stirred at room temperature for three hours and allowed to stand for five hours to form a gel. Finally, the resulting gel was dried under reduced pressure at 60° C. for two hours to produce a silica gel doped with perchloric acid. To the so produced silica gel, doped with perchloric acid, NMP in which was dispersed fullerenol was added to give a fullerenol to silica gel weight ratio of 1:50. The resulting mass was stirred to vaporize off NMP to produce the proton conductor. In forming the film, no such problem as occurred in the above-described Comparative Example was encountered.

The ionic conductivity of the so produced proton conductor was measured in the same way as in Example 1. As a result, the ionic conductivity indicated a value of $2.5 \times 10^{-2}$ S/cm. The value of conductivity was not seen to be lowered even when the proton conductor was stored in a dry atmosphere. It may therefore be seen that, with the present invention, there may be obtained a proton conductor which is satisfactory in film forming properties and workability, indicates a high ionic conductivity and which is not lowered in ionic conductivity even under a dry atmosphere.

EXAMPLE 3

In the present Example, a proton conductor was synthesized in the same way as in Example 2, except employing, as bronsted acid, phosphorus tungstic acid ($H_3PW_{12}O_{40} \cdot 29H_2O$), as a phosphoric acid derivative, in place of hydrochloric acid. It is noted that phosphorus tungstic acid was added to the mixed solution of TEOS, ethanol, pure water and hydrochloric acid so that the weight of phosphorus tungstic acid will be 45% of the weight of silica gel, doped with phosphorus tungstic acid, which is estimated to be produced. To the so produced silica gel, doped with perchloric acid, NMP in which was dispersed fullerenol was added to give a fullerenol to silica gel weight ratio of 1:70. The resulting mass was stirred to vaporize off NMP to produce the proton conductor. In forming the film, no such problem as occurred in the above-described Comparative Example was encountered.

The ionic conductivity of the so produced proton conductor was measured in the same way as in Example 1. As a result, the ionic conductivity indicated a value of $1.8 \times 10^{-3}$ S/cm. It may therefore be seen that, with the present invention, there may be obtained a proton conductor which is satisfactory in film forming properties and workability, and which indicates a high ionic conductivity.

EXAMPLE 4

In the present Example, a proton conductor was synthesized in the same way as in Example 3, except employing, as bronsted acid, phosphorus molybdic acid ($H_3PWo_{12}O_{40} \cdot 29H_2O$), as a phosphoric acid derivative, in place of hydrochloric acid used in Example 1. In forming the film, no such problem as occurred in the above-described Comparative Example was encountered.

The ionic conductivity of the so produced proton conductor was measured in the same way as in Example 1. As a result, the ionic conductivity indicated a value of $1.5 \times 10^{-3}$ S/cm. The value of conductivity was not seen to be lowered even when the proton conductor was stored in a dry atmosphere. It may therefore be seen that, with the present invention, there may be obtained a proton conductor which is satisfactory in film forming properties and workability and which indicates a high ionic conductivity.

EXAMPLE 5

In the present Example, a proton conductor was synthesized in the same way as in Example 3, except employing silicon isopropoxide, as a starting material yielding silicon oxide, in place of TEOS used in Example 1. In forming the film, no such problem as occurred in the above-described Comparative Example was encountered.

The ionic conductivity of the so produced proton conductor was measured in the same way as in Example 1. As a result, the ionic conductivity indicated a value of $1.2 \times 10^{-3}$ S/cm. The value of conductivity was not seen to be lowered even when the proton conductor was stored in a dry atmosphere. It may therefore be seen that, with the present invention, there may be obtained a proton conductor which is satisfactory in film forming properties and workability, indicates a high ionic conductivity and which is not lowered in ionic conductivity even in a dry atmosphere.

EXAMPLE 6

In the present Example, a proton conductor was obtained in the same way as in Example 1 except changing the amount of fullerenol, as a derivative of the carbonaceous material, into the carbonaceous material of which, predominantly composed of carbon, proton dissociating groups have been introduced. The silica gel, doped with phosphoric acid, was synthesized in the same way as in Example 1. To this silica gel was added NMP in which was dispersed fullerenol to give a fullerenol to silica gel weight ratio of 1:50. The resulting mass was stirred to vaporize off NMP to produce the proton conductor. In forming the film, no such problem as occurred in the above-described Comparative Example was encountered.

The ionic conductivity of the so produced proton conductor was measured in the same way as in Example 1. As a result, the ionic conductivity indicated a value of $4.0 \times 10^{-3}$ S/cm. It may therefore be seen that, with the present invention, there may be obtained a proton conductor which is satisfactory in film forming properties and workability, indicates a high ionic conductivity and which is not lowered in ionic conductivity even in a dry atmosphere.

EXAMPLE 7

In the present Example, a proton conductor was synthesized in the same way as in Example 1, except employing, as a derivative of the carbonaceous material, into the carbonaceous material of which predominantly composed of carbon are introduced proton dissociating groups, fullerenol in the form of hydrogen sulfate (ester) obtained on hydrogen sulfate esterification of hydroxy groups ($C_{60}(OSO_3H)_{12}$) in place of hydrochloric acid used in Example 1. In forming the film, no such problem as occurred in the above-described Comparative Example was encountered.

The ionic conductivity of the so produced proton conductor was measured in the same way as in Example 1. As a result, the ionic conductivity indicated a value of $3.3 \times 10^{-2}$ S/cm. The value of conductivity was not seen to be lowered even when the proton conductor was stored in a dry atmosphere. It may therefore be seen that, with the present invention, there may be obtained a proton conductor which is satisfactory in film forming properties and workability, indicates a high ionic conductivity and which is not lowered in ionic conductivity even in a dry atmosphere.

EXAMPLE 8

In the present Example, a proton conductor was synthesized in the same way as in Example 3, except employing sulfonated fullerene ($C_{60}(SO_3H)_{12}$) in place of fullerenol used in Example 1. In forming the film, no such problem as occurred in the above-described Comparative Example was encountered.

The ionic conductivity of the so produced proton conductor was measured in the same way as in Example 1. As a result, the ionic conductivity indicated a value of $3.5 \times 10^{-2}$ S/cm. The value of conductivity was not seen to be lowered even when the proton conductor was stored in a dry atmosphere. It may therefore be seen that, with the present invention, there may be obtained a proton conductor which is satisfactory in film forming properties and workability, indicates a high ionic conductivity and which is not lowered in ionic conductivity even in a dry atmosphere.

EXAMPLE 9

In the present Example, a proton conductor was synthesized in the same way as in Example 1, except employing sulfonated carbon soot, in place of fullerenol used in Example 1, as a derivative of the carbonaceous material, into the carbonaceous material of which predominantly composed of carbon are introduced proton dissociating groups. In this case, carbon soot which is obtained in addition to fullerene in producing fullerene by arc discharge and which is processed in the presence of fuming sulfuric acid, is used as a mixing ingredient. In forming the film, no such problem as occurred in the above-described Comparative Example was encountered.

The ionic conductivity of the so produced proton conductor was measured in the same way as in Example 1. As a result, the ionic conductivity indicated a value of $1.5 \times 10^{-2}$ S/cm. It may therefore be seen that, with the present invention, there may be obtained a proton conductor which is satisfactory in film forming properties and workability, indicates a high ionic conductivity and which is not lowered in ionic conductivity even in a dry atmosphere.

EXAMPLE 10

In the present Example, a proton conductor was synthesized in the same way as in Example 1, except employing a sulfonated fullerene polymer in place of hydrochloric acid used in Example 1, as a derivative of the carbonaceous material, into the carbonaceous material of which predominantly composed of carbon are introduced proton dissociating groups. The fullerene polymer was obtained on firing fullerene powders at 1000° C. for one hour, in an argon atmosphere, using iron as a catalyst. Sulfonation was by processing in the presence of fuming sulfuric acid. In forming the film, no such problem as occurred in the above-described Comparative Example was encountered.

The ionic conductivity of the so produced proton conductor was measured in the same way as in Example 1. As a result, the ionic conductivity indicated a value of $1.8 \times 10^{-2}$ S/cm. The value of conductivity was not seen to be lowered even when the proton conductor was stored in a dry atmosphere. It may therefore be seen that, with the present invention, there may be obtained a proton conductor which is satisfactory in film forming properties and workability, indicates a high ionic conductivity and which is not lowered in ionic conductivity even in a dry atmosphere.

EXAMPLE 11

In the present Example, a proton conductor was synthesized in the same way as in Example 1, except employing, in place of fullerenol used in Example 1, a sulfonated carbonaceous material, containing a diamond structure, as a derivative of the carbonaceous material, into the carbonaceous material of which predominantly composed of carbon are introduced proton dissociating groups. The carbonaceous material was obtained by the CVD (chemical vapor deposition) method and powders so formed were processed in the presence of fuming sulfuric acid for sulfonation. In forming the film, no such problem as occurred in the above-described Comparative Example was encountered.

The ionic conductivity of the so produced proton conductor was measured in the same way as in Example 1. As a result, the ionic conductivity indicated a value of $4.8 \times 10^{-4}$ S/cm. On the other hand, conductivity was not seen to be lowered on storage in a dry atmosphere. It was seen from Example 11 above that although a sufficient amount of sulfone groups comparable to that introduced to other carbonaceous materials were occasionally not introduced to the diamond structure, so that the carbonaceous material of the Example was lowered, such a proton conductor may be obtained in this Example which has good film forming properties and workability and in which ionic conductivity is not lowered even in a dry atmosphere.

EXAMPLE 12

In this Example, a fuel cell having a structure shown in FIG. 7 was prepared with a proton conductor.

First, NMP in which was dispersed fullerenol was added to the silica gel, doped with phosphoric acid, as obtained in Example 1. The resulting mass was kneaded until it was slurried. The slurried mass then was coated on a polyethylene tetrafluoride plate, by a doctor blade method, to a thickness of 50 μm. After vaporizing off NMP under reduced pressure, the coating was peeled off from the polyethylene tetrafluoride plate to produce an electrolyte layer for the fuel cell. As a gas diffusion electrode, a carbon electrode carrying platinum in an amount of for example 0.35 mg/cm$^2$ was used. The NMP in which was dispersed fullerenol was added to the silica gel, doped with phosphoric acid, to give the mass similar to that used for forming the electrolyte layer for the fuel cell. The resulting mass was sprayed onto this gas diffusion electrode and dried under reduced pressure for use as an electrode. The above electrolyte layer was sandwiched by two such electrodes and press-worked at room temperature to prepare a fuel cell device. Using the so produced fuel cell device, the fuel cell shown in FIG. 7 was produced.

Figure 8:
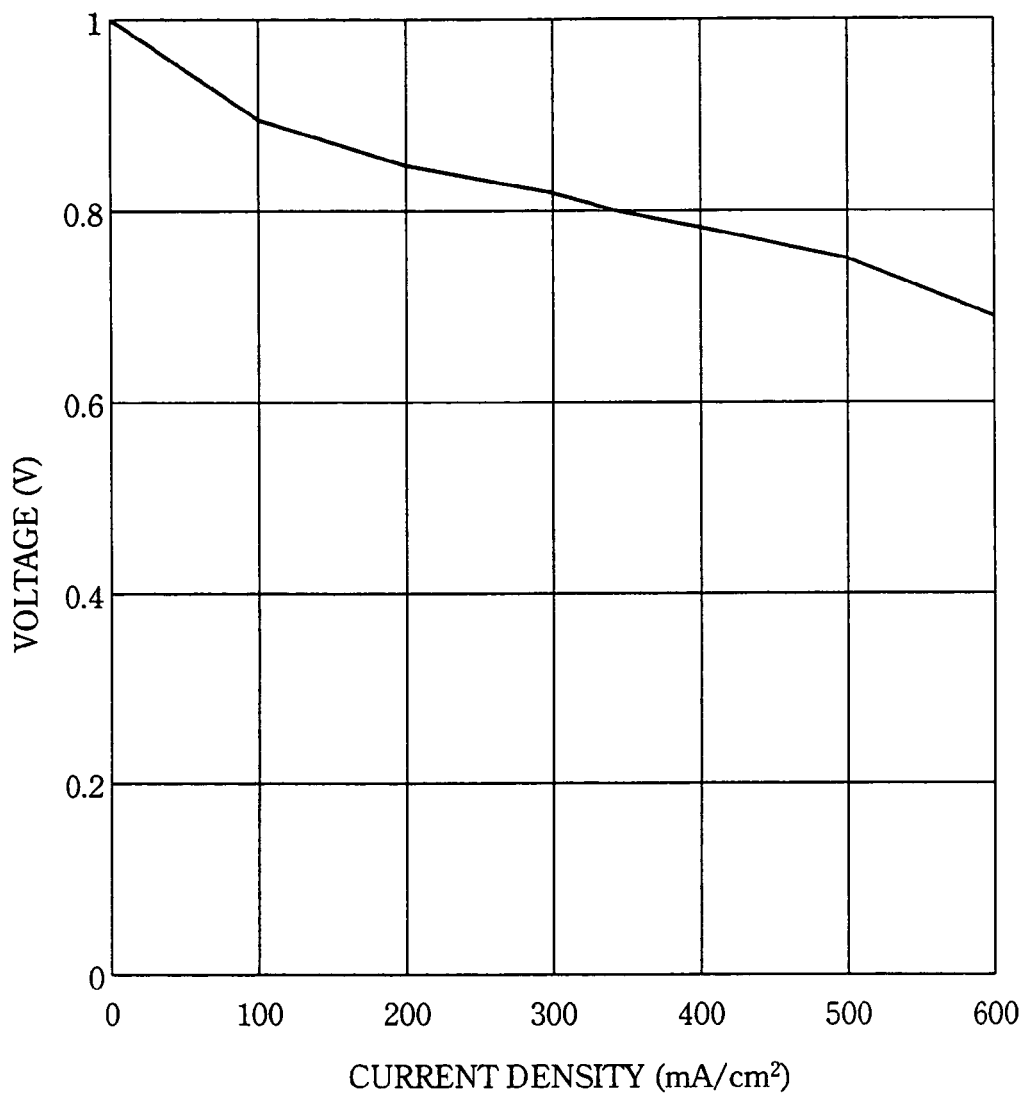
FIG. 8 is a graph showing a voltage-current curve of a fuel cell according to an embodiment of the present invention.

In conducting a cell test, hydrogen pressurized to 3 atm and air pressurized to 5 atm were sent to an H$_2$ channel and to an O$_2$ channel 9, respectively, to check for the relationship between the output current and the cell voltage. The resulting voltage-current curve is shown in FIG. 8. As may be seen from FIG. 8, the cell voltage was maintained at a value not lower than 0.6V even when the current of 400 mA/cm$^2$ was caused to flow, thus indicating that the fuel cell obtained with the present embodiment exhibits high output characteristics.

It may be seen that, with use of the proton conductor according to an embodiment of the present invention, fuel cells having superior characteristics can be obtained.

In the above-described embodiment, description has been made only with respect to the use of fullerenol, fullerenol in the form of a hydrogen sulfate (ester) and sulfonated fullerene as a derivative of the carbonaceous material comprised of the carbonaceous material predominantly composed of carbon to which have been introduced the proton dissociating groups. Similar effects may, of course, be obtained with use of other derivatives of the carbonaceous materials than those listed in the foregoing embodiments. Although the use of phosphoric acid and perchloric acid has been explained as bronsted acid in the foregoing embodiments, similar effects can, of course, be obtained when boric acid, silicic acid or plural species of the bronsted acid are used in combination. That is, the present invention is not limited to the bronsted acids listed in the above-described embodiment.

Although the description of the above-described embodiment is directed to the fuel cell as the electro-chemical device of the present invention employing the proton conductor of the present invention, the present invention can be applied to those electro-chemical devices not explained in the foregoing embodiment, such as cell, pH sensor and/or the like. That is, the electro-chemical devices to which the present invention is applied are not limited to those explained in the above-described embodiments.

As described above, in a carbonaceous material forming the constituent material of the proton conductor of the present invention in an embodiment, a sufficient amount of proton dissociating groups as compared to that introduced to other carbonaceous materials having a polymer material as a skeleton can be introduced, so that an optimum proton conductor layer may be formed on an interface between silicon oxide, bronsted acid and the derivative of the carbonaceous material. Consequently, the proton conductor according to an embodiment of the present invention, employing silicon oxide and bronsted acid, has a high mobile ion concentration. In addition, the proton conductor according to an embodiment of the present invention, containing the derivative of the carbonaceous material is able to realize high protonic conductivity.

Since the present invention uses a derivative of the carbonaceous material, composed predominantly of carbon, as a constituent material of the proton conductor, the proton conductor according to the present invention may operate in a low humidity atmosphere, such that its protonic conductivity is not lowered even in a dry atmosphere.

Since the derivative of the carbonaceous material is not a polymer material, its mechanical interaction with silicon oxide is less than that in case of the carbonaceous materials having a polymer material as a skeleton. Consequently, the proton conductor according to an embodiment of the present invention exhibits flexibility while retaining high ionic conductivity, and is superior in film-forming properties and workability.

The electro-chemical device according to an embodiment the present invention includes first and second poles and an electrolyte electrically contacted with these poles, with the electrolyte being a proton conductor composed of silicon oxide, bronsted acid and a derivative of the carbonaceous material. Consequently, the electro-chemical device according to an embodiment of the present invention can exhibit favorable effects similar to those of the proton conductor of the present invention, thus realizing reduction in size and a simpler structure of the system. Moreover, the electro-chemical device according to an embodiment of the present invention is superior in current density and output characteristics.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A proton conductor comprising:
silicon oxide;
a bronsted acid; and
a derivative of a carbonaceous material substantially composed of carbon and proton ($H^+$) dissociating groups introduced to carbon atoms of the carbonaceous material, wherein the derivative of the carbonaceous material is interposed in the silicon oxide and the bronsted acid, and the carbonaceous material is substantially composed of carbon clusters that are aggregates of carbon atoms.

2. The proton conductor according to claim 1 wherein the bronsted acid includes phosphoric acid ($H_3PO_4$) or derivatives thereof.

3. The proton conductor according to claim 1 wherein the bronsted acid includes perchloric acid ($HClO_4$) or derivatives thereof.

4. The proton conductor according to claim 1 wherein the silicon oxide is represented by the formula:

$$SiO_x$$

where $1 \leq x \leq 2$.

5. The proton conductor according to claim 1 wherein a compound substantially composed of silicon oxide and bronsted acid is formed, the compound having a weight ratio of (1:1) to (100:1) with respect to the derivative of the carbonaceous material.

6. The proton conductor according to claim 1 wherein the carbonaceous material is selected from the group consisting of fullerene molecules, a structure having an open end at least a portion of the fullerene structure, a structure having a diamond structure and combinations thereof.

7. The proton conductor according to claim 6 wherein the fullerene molecules are molecules of spherical carbon cluster molecules $C_m$, where m is at least one of 36, 60, 70, 76, 78, 80, 82 and 84.

8. The proton conductor according to claim 1 wherein the carbonaceous material is composed of the carbon clusters coupled together.

9. The proton conductor according to claim 1 wherein the carbonaceous material is composed of carbon nanotubes.

10. The proton conductor according to claim 1 wherein the proton dissociating groups are represented by the formula —XH, where X is a bivalent atom or atom group thereof and where H is a hydrogen atom.

11. The proton conductor according to claim 10 wherein the proton dissociating groups are selected from the group consisting of —OH, —YOH, and combinations thereof where Y is a bivalent atom or atom group thereof and where H is a hydrogen atom.

12. The proton conductor according to claim 10 wherein the proton dissociating groups are selected from the group consisting of —OH, —$OSO_3H$, —COOH, —$SO_3H$, —$OPO(OH)_2$ and combinations thereof.

13. A method of manufacturing a proton conductor comprising:
forming a compound predominantly composed of silicon oxide and a bronsted acid by a sol-gel method; and
mixing the compound with a derivative of a carbonaceous material obtained by introducing proton ($H^+$) dissociating groups to carbon atoms of the carbonaceous material thereby forming a carbonaceous material predominantly composed of carbon, and the carbonaceous material is predominantly composed of carbon clusters that are aggregates of carbon atoms.

14. The method according to claim 13 wherein the bronsted acid includes phosphoric acid ($H_3PO_4$) or derivatives thereof.

15. The method according to claim 13 wherein the bronsted acid includes perchioric acid ($HClO_4$) or derivatives thereof.

16. The method according to claim 13 wherein the silicon oxide is represented by the formula:

$$SiO_x$$

where $1 \leq x \leq 2$.

17. The method according to claim 13 wherein a compound predominantly composed of silicon oxide and bronsted acid is formed, the compound having a weight ratio of (1:1) to (100:1) to the derivative of the carbonaceous material.

18. The method according to claim 13 herein the carbonaceous material is selected from the group consisting of fullerene molecules, a structure having an open end at least a portion of the fullerene structure, a structure having a diamond structure and combinations thereof.

19. The method according to claim 18 wherein the fullerene molecules are molecules of spherical carbon cluster molecules $C_m$, where m is at least one of 36, 60, 70, 76, 78, 80, 82 and 84.

20. The method according to claim 13 wherein the carbonaceous material is composed of the carbon clusters coupled together.

21. The method according to claim 13 wherein the carbonaceous material include carbon nanotubes.

22. The method according to claim 13 wherein the proton dissociating groups are —XH, where X is a bivalent atom or atom group thereof and where H is a hydrogen atom.

23. The method according to claim 22 wherein the proton dissociating groups are at least one of —OH and —YOH, where Y is a bivalent atom or atom group thereof and where H is a hydrogen atom.

24. The method according to claim 22 wherein the proton dissociating groups are selected from the group consisting of —OH, —$OSO_3H$, —COOH, —$SO_3H$, —$OPO(OH)_2$ and combinations thereof.

25. An electro-chemical device comprising a first electrode, a second electrode and an electrolyte electrically contacted with the first electrode and the second electrode, wherein
the electrolyte is composed of silicon oxide, a bronsted acid and a derivative of a carbonaceous material including proton (H$^+$) dissociating groups introduced to carbon atoms of the carbonaceous material predominantly composed of carbon, wherein the derivative of the carbonaceous material is interposed in the silicon oxide and the bronsted acid, and the carbonaceous material is predominantly composed of carbon clusters which are aggregates of carbon atoms.

26. The electro-chemical device according to claim 25 wherein the bronsted acid includes phosphoric acid (H$_3$PO$_4$) or derivatives thereof.

27. The electro-chemical device according to claim 25 wherein the bronsted acid includes perchloric acid (HClO$_4$) or derivatives thereof.

28. The electro-chemical device according to claim 25 wherein the silicon oxide is represented by the formula:

$$SiOx \ (1 \leq x \leq 2) \tag{1}$$

29. The electro-chemical device according to claim 25 wherein a compound predominantly composed of silicon oxide and bronsted acid is formed, the compound having a weight ratio of (1:1) to (100:1) with respect to the derivative of the carbonaceous material.

30. The electro-chemical device according to claim 25, wherein the carbonaceous material is at least one selected from the group consisting of fullerene molecules, a structure having an open end at least a portion of the fullerene structure and a structure having a diamond structure.

31. The electro-chemical device according to claim 30 wherein the fullerene molecules are molecules of spherical carbon cluster molecules C$_m$, where m is at least one of 36, 60, 70, 76, 78, 80, 82 and 84.

32. The electro-chemical device according to claim 25, wherein the carbonaceous material is composed of the carbon clusters coupled together.

33. The electro-chemical device according to claim 25 wherein the carbonaceous material includes carbon nanotubes.

34. The electro-chemical device according to claim 25 wherein the proton dissociating groups are —XH, where X is a bivalent atom or atom group thereof and where H is a hydrogen atom.

35. The electro-chemical device according to claim 25 wherein the proton dissociating groups are at least one of —OH and —YOH, where Y is a bivalent atom or atom group thereof.

36. The electro-chemical device according to claim 35 wherein the proton dissociating groups are selected from the group consisting —OH, —OSO$_3$H, —COOH, —SO$_3$H, —OPO(OH)$_2$ and combinations thereof.

37. The electro-chemical device according to claim 25 wherein the device is arranged as a fuel cell, a first gas including hydrogen is supplied to a first pole and wherein gas including oxygen is supplied to a second pole.

38. A proton conductor comprising:
silicon oxide;
a bronsted acid; and
a derivative of a carbonaceous material substantially composed of carbon and proton (H$^+$) dissociating groups introduced to carbon atoms of the carbonaceous material, wherein the derivative of the carbonaceous material is interposed in the silicon oxide and the bronsted acid, and wherein the carbonaceous material is composed of carbon nanotubes.

39. A method of manufacturing a proton conductor comprising:
forming a compound predominantly composed of silicon oxide and a bronsted acid by a sol-gel method; and
mixing the compound with a derivative of a carbonaceous material obtained by introducing proton (H$^+$) dissociating groups to carbon atoms of the carbonaceous material thereby forming a carbonaceous material predominantly composed of carbon, wherein the carbonaceous material is composed of the carbon clusters coupled together.

40. A method of manufacturing a proton conductor comprising:
forming a compound predominantly composed of silicon oxide and a bronsted acid by a sol-gel method; and
mixing the compound with a derivative of a carbonaceous material obtained by introducing proton (H$^+$) dissociating groups to carbon atoms of the carbonaceous material thereby forming a carbonaceous material predominantly composed of carbon, wherein the carbonaceous material include carbon nanotubes.

41. An electro-chemical device comprising a first electrode, a second electrode and an electrolyte electrically contacted with the first electrode and the second electrode, wherein
the electrolyte is composed of silicon oxide, a bronsted acid and a derivative of a carbonaceous material including proton (H$^+$) dissociating groups introduced to carbon atoms of the carbonaceous material predominantly composed of carbon, wherein the derivative of the carbonaceous material is interposed in the silicon oxide and the bronsted acid, wherein the carbonaceous material includes carbon nanotubes.

* * * * *